United States Patent [19]

Flotow et al.

[11] Patent Number: 5,067,602
[45] Date of Patent: Nov. 26, 1991

[54] INTERNALLY ASSISTED CLUTCH

[75] Inventors: Richard A. Flotow, Butler; Gordon W. Denton, Ft. Wayne, both of Ind.

[73] Assignee: Dana Corporation, Toledo, Ohio

[21] Appl. No.: 523,068

[22] Filed: May 14, 1990

[51] Int. Cl.[5] .................. F16D 13/50; F16D 13/54
[52] U.S. Cl. ........................... 192/70.27; 192/70.28
[58] Field of Search .......... 192/70.27, 70.28, 89 B, 192/89 QT

[56] References Cited

U.S. PATENT DOCUMENTS

| 1,131,769 | 3/1915 | Borg | 192/70.26 |
| 1,236,652 | 8/1917 | Asprooth | 192/70.26 |
| 1,279,137 | 9/1918 | Miller | 192/70.29 |
| 1,339,801 | 5/1920 | White | 192/70.29 |
| 1,381,960 | 6/1921 | Belden | 192/70.26 |
| 1,419,849 | 6/1922 | Harrington | 192/70.26 |
| 1,472,114 | 10/1923 | Browne | 192/70.26 |
| 1,601,235 | 9/1926 | Bullard et al. | 192/70.29 |
| 1,609,467 | 12/1926 | Fawick | 192/70.27 |
| 1,610,814 | 12/1926 | Pfaff | 192/70.26 |
| 1,983,885 | 12/1934 | Spase | 192/70.12 |
| 2,057,802 | 10/1936 | Tatter | 192/111 A |
| 2,234,755 | 3/1941 | Geyer | 192/70.27 |
| 3,176,814 | 4/1965 | Sink | 192/111 B |
| 3,822,772 | 7/1974 | Murakami | 192/70.25 X |
| 4,057,131 | 11/1977 | Flotow | 192/70.13 |
| 4,556,133 | 12/1985 | Huber | 192/70.27 X |
| 4,566,573 | 1/1986 | Lane, Jr. | 192/70.28 X |
| 4,760,906 | 8/1988 | Flotow et al. | 192/70.28 X |
| 4,809,834 | 3/1989 | Channing | 192/70.27 |
| 4,856,634 | 8/1989 | Kitano et al. | 192/70.3 |

Primary Examiner—Allan D. Herrmann
Assistant Examiner—Nicholas Whitelaw
Attorney, Agent, or Firm—MacMillan, Sobanski & Todd

[57] ABSTRACT

An internally assisted friction clutch having both engagement springs and assister springs extending between a cover and a release sleeve is disclosed. The radially directed forces exerted by the springs continually center and rotatably drive the release sleeve co-axially relative to the cover under normal operating conditions. In order to prevent excessive relative rotation, a plurality of protrusions are formed on the release sleeve which extend into respective recesses formed on the cover. The recesses are sized to be significantly larger than the protrusions so as to cause engagement only when four to five degrees of relative rotational movement or more occurs between the release sleeve and the cover.

9 Claims, 5 Drawing Sheets

INTERNALLY ASSISTED CLUTCH

BACKGROUND OF THE INVENTION

This invention relates in general to clutches and in particular to an internally assisted friction clutch which normally relies upon the forces generated by the engagement and assister springs for centering and rotating the release sleeve with the cover, and which further includes one or more cooperating protrusions and recesses formed on the release sleeve and the cover in order to prevent excessive relative rotation from occurring under extreme operating conditions.

Clutches are well known devices which are used to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A driven disc assembly is disposed within the clutch between the pressure plate and the flywheel. The driven disc assembly is carried on an output shaft of the clutch, which is also the input shaft to the transmission.

When the pressure plate is moved toward the flywheel, the driven disc assembly is frictionally engaged therebetween so as to cause the output shaft of the clutch to rotate with the flywheel, the cover, and the pressure plate. In this manner, the clutch is engaged to transmit power from the engine to the transmission to drive the vehicle. When the pressure plate is moved away from the flywheel, the driven disc assembly is released from such frictional engagement so as to disconnect this driving connection. The clutch is typically disengaged to permit a gear shifting operation to occur within the transmission.

A release assembly is provided for selectively moving the pressure plate back and forth in the axial direction, so as to engage and disengage the clutch as desired. The release assembly includes a generally cylindrical release sleeve which is disposed about the output shaft of the clutch. The forward end of the release sleeve extends within the clutch. A plurality of levers or similar actuating means is typically connected between the release sleeve and the cover. Portions of the levers abut the pressure plate such that movement of the release sleeve causes corresponding movement of the pressure plate. Engagement springs are typically mounted between the release sleeve and the cover for urging the release sleeve and the pressure plate toward their engaged positions. The rearward end of the release sleeve extends through a central opening formed through the cover. A bearing assembly is mounted on the rearward end of the release sleeve. A manually operable shift lever is connected to the bearing assembly for effecting movement of the release sleeve and, therefore, the pressure plate.

More recently, clutches have also been provided with a plurality of assister springs mounted between the release sleeve and the cover. The assister springs extend generally radially between the cover and the release sleeve when the clutch is engaged, thus exerting little or no axial force on the release sleeve. However, when the release sleeve is moved from its engaged position to its disengaged position, the assister springs are moved to an angular orientation. Consequently, the assister springs exert some axial force tending to move the release sleeve to its disengaged position.

Thus, it can be seen that the release sleeve rotates with the cover during use. Relative rotation between the release sleeve and the cover is undesirable because it causes wear on the levers connected therebetween. Also, excessive relative rotation can cause the engagement springs to be twisted off of their seats on the release sleeve and the cover, thus damaging the clutch. In order to prevent such relative rotation, some prior clutches have been provided with splines formed on the release sleeve which cooperate with corresponding splines formed on the cover. Other prior clutches have been provided with enlarged protrusions on the inner surface of the cover which extend into slots formed on an enlarged portion of the release sleeve.

In both of these prior clutch structures, the spacing between the engaging portions of the cover and the release sleeve is very close. In other words, only a very small amount of relative rotation is permitted before these portions engage one another to prevent further relative rotation. Unfortunately, the release sleeve constantly exerts a certain amount of drag relative to the cover because of friction in the bearing assembly. As a result of this drag, the engaging portions of these prior clutches frequently contact one another during use, even under low torque and speed operating conditions.

Such engagement, while desirable from the standpoint of preventing relative rotation, is undesirable because it causes wear between the engaging portions. Such engagement is also undesirable because it tends to resist axial movement of the release sleeve between the engaged and disengaged positions, thus decreasing the effective engagement force generated by the engagement springs and increasing the amount of force required to move the release sleeve toward the disengaged position. Thus, it would be desirable to provide a clutch structure which prevents relative rotation between the cover and the release sleeve without frequently causing undesirable frictional engagement therebetween.

SUMMARY OF THE INVENTION

This invention relates to an internally assisted friction clutch having both engagement springs and assister springs extending between a cover and a release sleeve. The radially directed forces exerted by the springs continually center the release sleeve co-axially relative to the cover. Under normal operating conditions, these radially directed forces are sufficient to rotatably drive the release sleeve with the cover and prevent relative rotation therebetween. This "floating" drive arrangement is desirable because there is no continuous mechanical connection between the cover and the release sleeve, which can cause wear and affect the operation of the clutch. In order to prevent excessive relative rotation between the cover and the release sleeve, a plurality of protrusions are formed on the release sleeve which extend into respective recesses formed on the cover. The recesses are sized to be significantly larger than the protrusions so as to cause engagement only when four to five degrees of relative rotational movement or more occurs between the release sleeve and the cover.

It is an object of this invention to provide a clutch which normally relies upon the forces generated by the engagement and assister springs for centering and rotating the release sleeve with the cover.

It is another object of this invention to provide such a clutch which further includes one or more cooperating protrusions and recesses formed on the release sleeve and the cover to prevent excessive relative rotation when extreme conditions occur.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
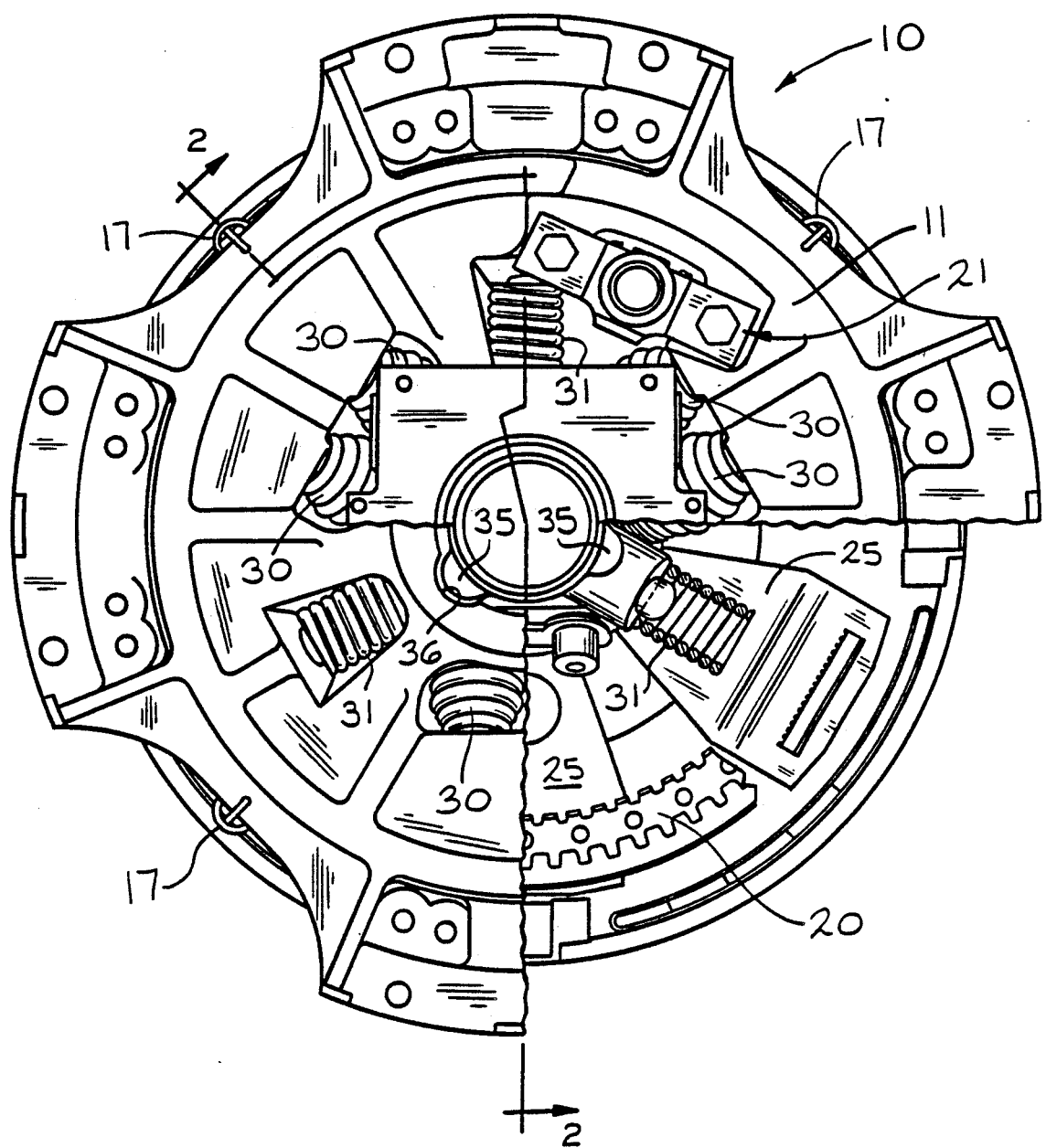
FIG. 1 is a front end elevational view of a clutch cover assembly in accordance with this invention.
Figure 2:
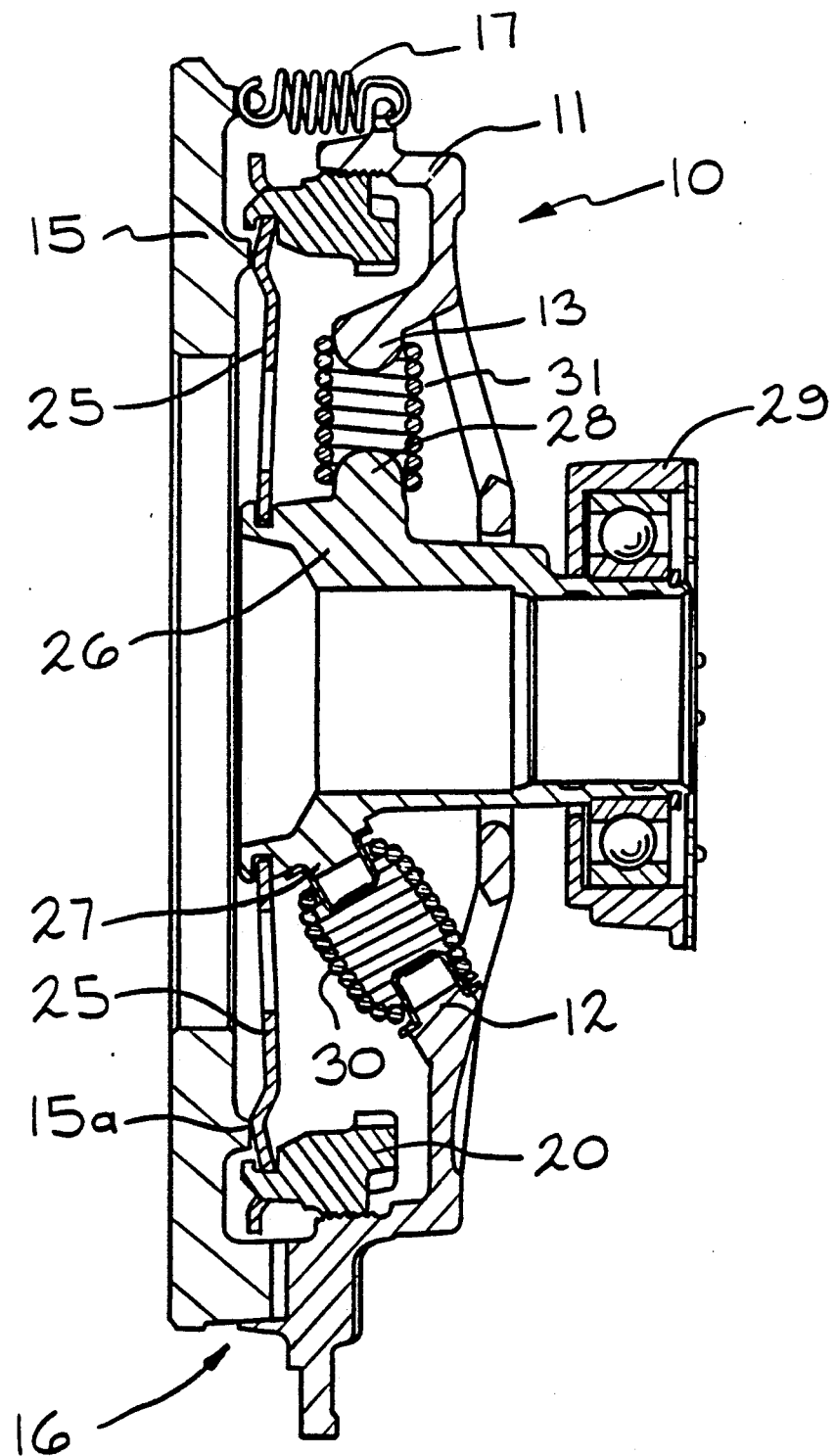
FIG. 2 is a sectional elevational view taken along line 2—2 of FIG. 1 showing the clutch cover assembly in its engaged position.
Figure 3:
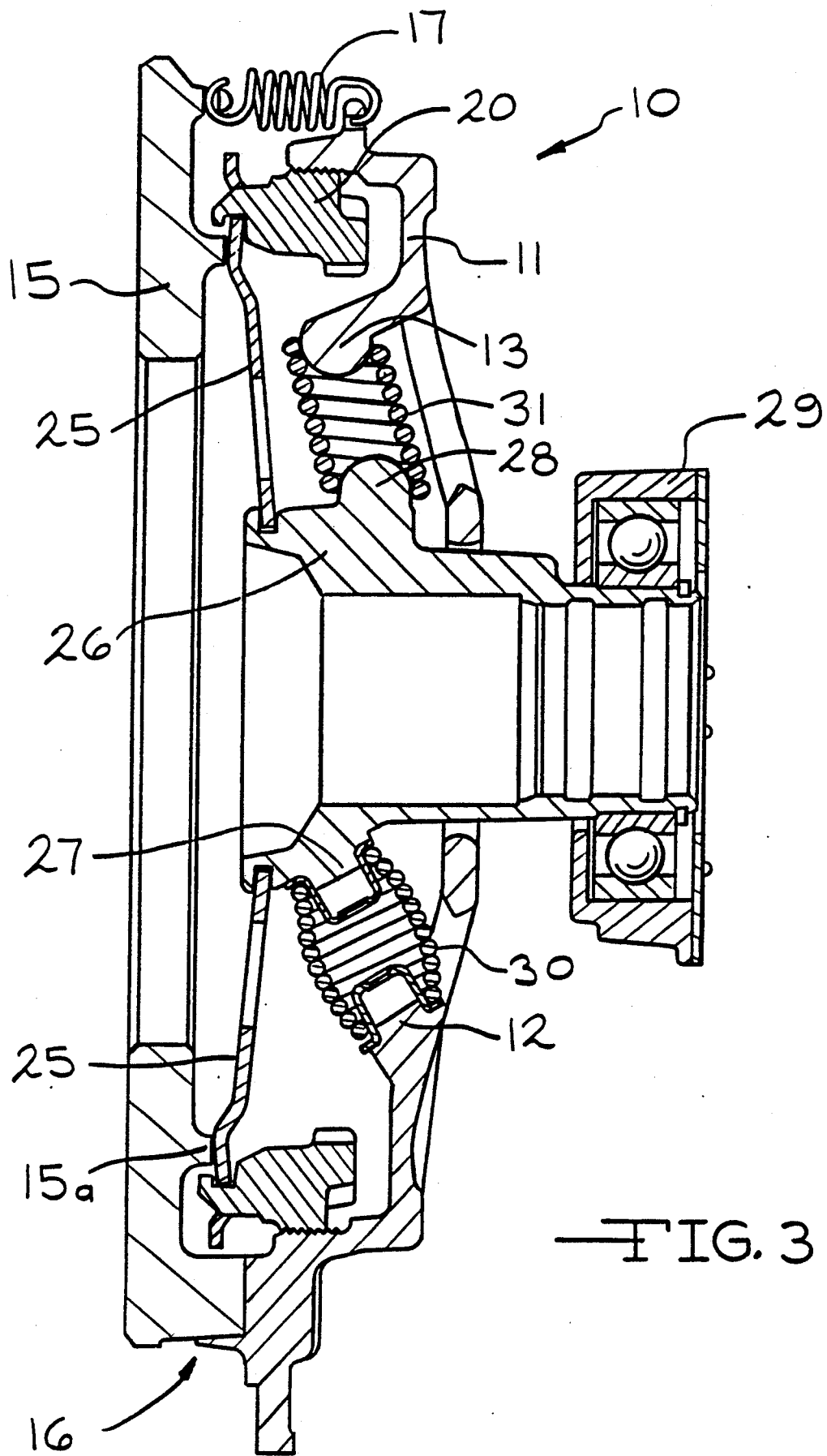
FIG. 3 is a sectional elevational view similar to FIG. 2 showing the clutch cover assembly in its disengaged position.
Figure 4:
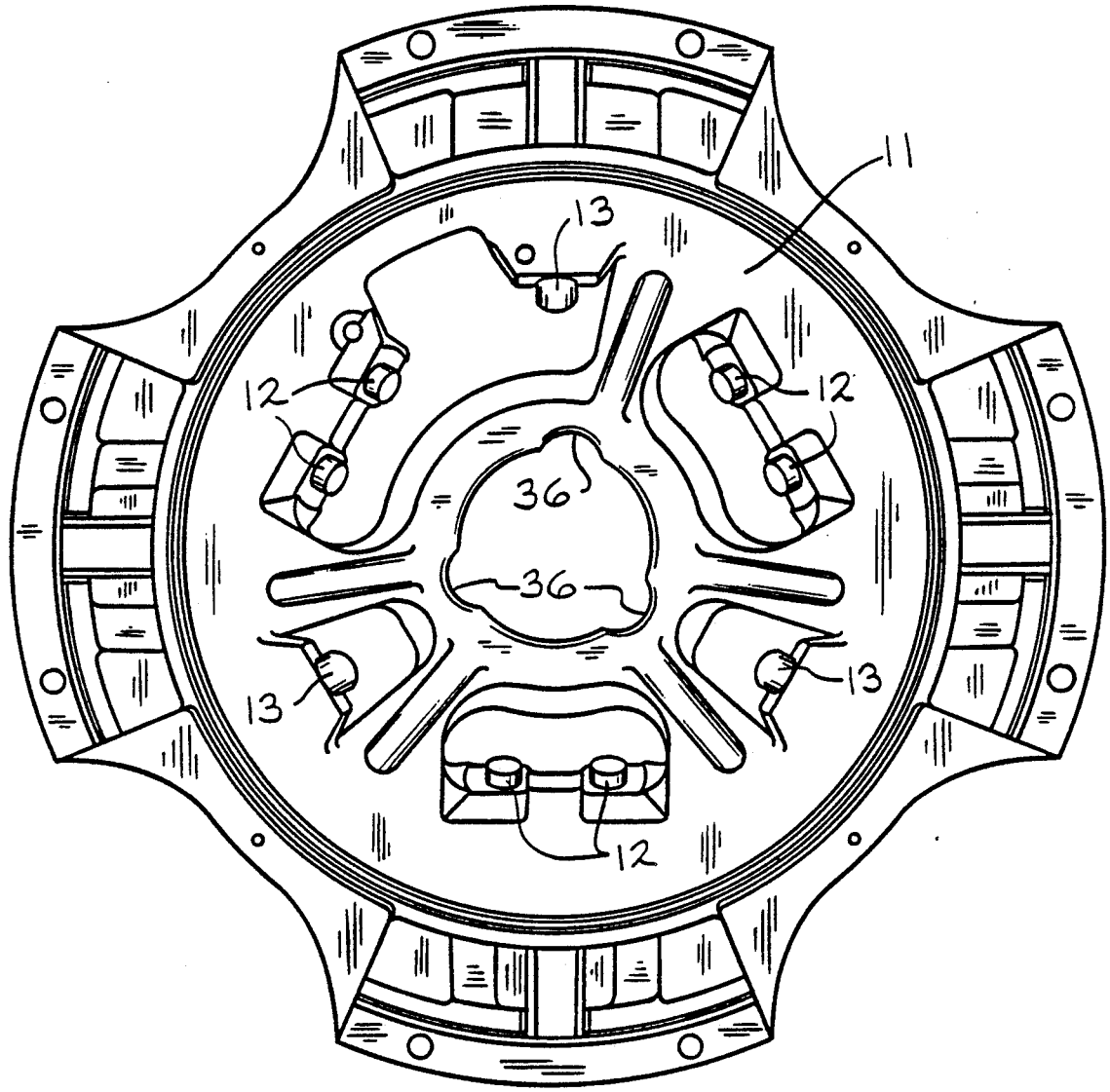
FIG. 4 is a rear end elevation view of the cover illustrated in FIGS. 1 through 3.

Referring now to the drawings, there is illustrated in FIGS. 1 through 3 a clutch cover assembly, indicated generally at 10, in accordance with this invention. The assembly 10 includes a cover 11 which is adapted to be connected to a flywheel (not sown) in a conventional manner for rotation therewith about a longitudinal axis. The cover 11 is preferably formed from a single piece of material, such as iron by casting. As best shown in FIGS. 1 and 4, the main body of the cover 11 is generally annular in shape and includes a plurality of engagement spring seats 12 formed integrally therewith. The cover 11 further includes a plurality of assister spring seats 13 formed integrally therewith. The purpose of these spring seats 12 and 13 will be discussed below.

An annular pressure plate 15 is connected to the cover 11 for rotation therewith by means of a plurality of spaced lugs and slots, indicated generally at 16 in FIGS. 2 and 3. The lug and slot arrangement is conventional in the art and permits the cover 11 to rotatably drive the pressure plate 15, while allowing the pressure plate 15 to move axially relative thereto, as is well known in the art. The pressure plate 15 is urged axially toward the cover 11 by a plurality of return springs 17 disposed about the periphery of the assembly 10. An annular shoulder 15a is formed about the pressure plate 15 facing toward the cover 11.

The clutch cover assembly 10 may include an adjusting ring, as shown at 20 in FIGS. 1 through 3. The adjusting ring 20 is conventional in the art and includes an outer threaded surface which is adapted to cooperate with an inner threaded surface formed on the cover 11. Rotation of the adjusting ring 20 relative to the cover 11 causes axial movement of the adjusting ring 20. A conventional automatic wear adjusting mechanism, indicated generally at 21 in FIG. 1, is provided for automatically rotating the adjusting ring 20 relative to the cover 11 as wear occurs in the clutch. The structure and operation of the adjusting ring 20 and the automatic wear adjusting mechanism 21 are described more fully in U.S. Pat. No. 3,752,286, the disclosure of which is incorporated herein by reference. As will become apparent below, however, this invention can be used on clutches which are manually adjustable and which are not adjustable.

A plurality of conventional levers 25 are provided within the clutch cover assembly 10. The levers 25 extend generally radially outwardly from the axis of rotation and are spaced equidistantly thereabout. The outermost ends of the levers 25 have slots formed therethrough to receive respective projections formed on the adjusting ring 20. The innermost ends of the levers 25 extend into a peripheral groove formed in a release sleeve 26. The release sleeve 26 is disposed co-axially about the axis of rotation and is axially movable therealong. The structure and operation of the release sleeve 26 will be discussed in greater detail below.

Between their outermost and innermost ends, the levers 25 engage the annular shoulder 15a of the pressure plate 15. Thus, as is well known in the art, axial movement of the release sleeve 26 causes the levers 25 to pivot about the projections of the adjusting ring 20, thereby causing axial movement of the pressure plate 15. For example, when the release sleeve 26 is moved toward the left when viewing FIGS. 2 and 3, the pressure plate 15 is also moved toward the left. This movement causes engagement of the clutch. When the release sleeve 26 is moved toward the right, the pressure plate 15 is also moved toward the right to disengage the clutch.

Figure 5:
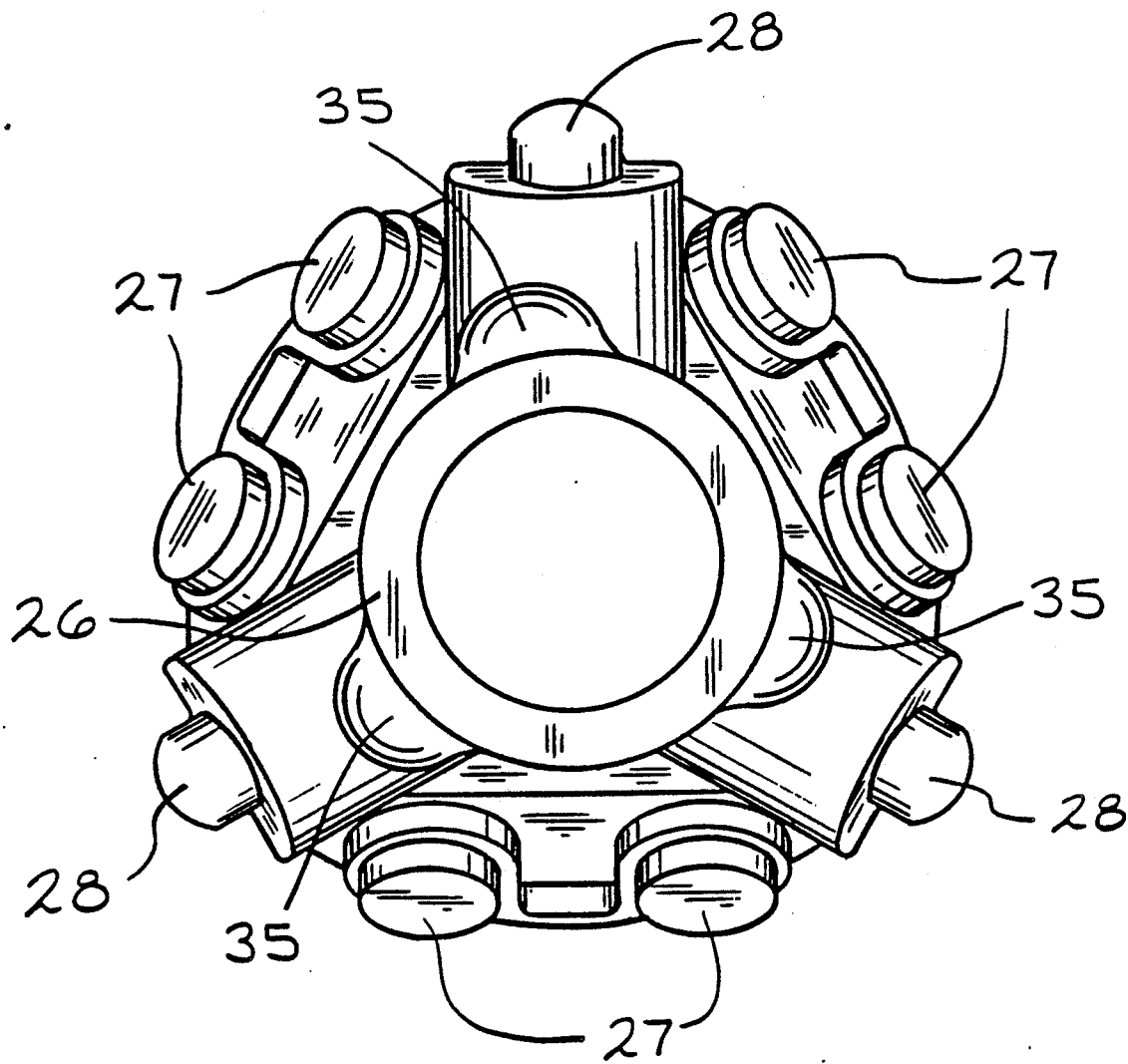
FIG. 5 is a rear end elevation view of the release sleeve illustrated in FIGS. 1 through 3.

As best shown in FIGS. 2, 3, and 5, the release sleeve 26 is formed generally in the shape of a hollow cylinder. The release sleeve 26 is preferably formed from a single piece of material, such as iron by casting. The forward end of the release sleeve 26 extends within the cover 11 and has the above-mentioned peripheral groove formed thereon for receiving the inner ends of the levers 25. A plurality of engagement spring seats 27 are formed integrally about the forward end of the release sleeve 26. A plurality of assister spring seats 28 are also formed integrally about the forward end of the release sleeve 26.

The rearward end of the release sleeve 26 extends outside of the assembly 10. A conventional throw-out bearing assembly 29 is secured to the rearward end of the release sleeve 26 for axial movement therewith, while permitting relative rotational movement. The bearing assembly 29 is adapted to be engaged and axially moved by a conventional linkage (not shown) so as to permit an operator selectively move the components of the assembly 10 between engaged and disengaged positions.

A conventional engagement spring 30 is supported between each of the engagement spring seats 12 formed on the cover 11 and its corresponding engagement spring seat 27 formed on the release sleeve 26. In a manner which is well known in the art, the engagement springs 30 urge the release sleeve 26 toward the left when viewing FIGS. 2 and 3, thus urging the pressure plate 15 toward the left into its engaged position, against the urging of the return springs 17. The force exerted axially by the engagement springs 30 is much larger than the force exerted by the return springs 17. Consequently, the release sleeve 26 and the pressure plate 15 are normally positioned in their engaged positions relative to the cover 11.

As discussed above, the release sleeve 26 is moved toward the right to move it and the pressure plate 17 to their disengaged positions. To accomplish this, an axial force must be exerted on the release sleeve 26 which can overcome the urging of the engagement springs 30. This force is supplied to the bearing assembly 32 by manual operation of the shift lever connected thereto. In order to reduce the amount of such force exerted by an operator without significantly reducing the magnitude of the force exerted by the engagement springs 30 when the clutch is engaged, a plurality of assister springs 31 are provided. The assister springs 31 are supported between each of the assister spring seats 13 formed on the cover 11 and the corresponding assister spring seats 28 formed on the release sleeve 26. The structure and operation of the assister springs 31, as well as the overall operation of the clutch 10, is described in detail in U.S. Pat. No. 4,760,906, the disclosure of which is incorporated herein by reference.

Under normal operating conditions, both the engagement springs 30 and the assister springs 31 exert forces radially inwardly against the release sleeve 26. This occurs regardless of whether the release sleeve 26 is in its engaged position, its disengaged position, or somewhere in between. As the release sleeve 26 is moved from the engaged position shown in FIG. 2 to the disengaged position shown in FIG. 3, the assister springs 31 are moved from a generally radial orientation to an angled orientation. As a result, the magnitude of the radially inwardly directed force exerted by such assister springs 31 decreases as the release sleeve 26 moves closer to its disengaged position. At the same time, however, the engagement springs 30 are moved from a large angle orientation to a smaller angle orientation, thus increasing the magnitude of the radially inwardly directed force exerted thereby as the release sleeve 26 moves closer to its disengaged position.

It will be appreciated, therefore, that the combined use of the engagement springs 30 and the assister springs 31 continually tends to center the release sleeve 26 co-axially relative to the cover 11. Under normal operating conditions, these radially directed forces are sufficient to rotatably drive the release sleeve 26 with the cover 11 and prevent relative rotation therebetween. This "floating" drive arrangement is desirable because there is no frequent or continuous mechanical connection between the cover 11 and the release sleeve 26. As discussed above, such a connection is undesirable because it can cause wear on these components and because it can affect the operation of the clutch 10.

However, in certain unusual situations, the combined radially directed forces exerted by the engagement springs 30 and the assister springs 31 may be insufficient to prevent relative rotation between the cover 11 and the release sleeve 26. Such a situation might occur if the bearing assembly 29 were to seize or otherwise malfunction. If this situation were to occur, the release sleeve 26 would rotate relative to the cover 11 until either some of the springs 30 or 31 were compressed to a solid condition or until the springs 30 or 31 were twisted so far as to fall off of their respective seats. Neither of these failure modes is desirable because it could cause extensive damage to the clutch.

Accordingly, a fail safe mechanism is provided to prevent excessive rotation of the release sleeve 26 relative to the clutch 11 in the event of an abnormal situation, such as described above. The fail safe mechanism includes a plurality of protrusions 35 formed integrally on the center or sleeve portion of the release sleeve 26. These protrusions 35 extend radially outwardly from the release sleeve 26 into corresponding recesses 36 formed in the cover 11.

As shown in FIG. 1, the recesses 36 are sized significantly larger than the protrusions 35. Thus, the protrusions 35 are received within the recesses 36 but do not, under normal operating conditions, engage the sides thereof. In the event of an abnormal situation, however, the protrusions 35 will engage the sides of the recesses 36 when the release sleeve 26 has rotated a predetermined amount relative to the cover 11. Preferably, the protrusions 35 will engage the recesses after four to five degrees of relative movement, although a larger range of movement may be desirable in some circumstances. In this manner, a positive stop is provided to prevent serious damage from occurring to the clutch.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clutch cover assembly comprising:
   a cover;
   a pressure plate;
   means for connecting said pressure plate to said cover for rotation therewith and for axial movement relative thereto between engaged and disengaged positions relative to said cover;
   means for selectively moving said pressure plate between said engaged and disengaged positions;
   first resilient means extending between said cover and said means for selectively moving said pressure plate for exerting a relatively large force to urge said pressure plate towards said engaged position;
   second resilient means extending between said cover and said means for selectively moving said pressure plate for exerting a relatively small force to urge said pressure plate toward said disengaged position; and
   means formed on said cover and said means for selectively moving said pressure plate for preventing excessive relative rotation therebetween, said means for preventing excessive relative rotation including a recess formed in said cover and a protrusion formed on said means for selectively connecting, said protrusion extending into said recess and engaging said cover when a predetermined amount of relative rotation occurs therebetween.

2. The invention defined in claim 1 wherein said cover has an aperture formed therethrough defining an inner surface, and wherein said recess is formed in said inner surface.

3. The invention defined in claim 2 wherein said recess is sized larger than said protrusion such that said protrusion does not normally engage said cover to permit a limited amount of relative rotation therebetween to occur.

4. The invention defined in claim 1 wherein said means for preventing excessive relative rotation includes a plurality of recesses formed in said cover and a corresponding number of protrusions formed on said means for selectively connecting, said protrusions extending into said recess and engaging said cover when a predetermined amount of relative rotation occurs therebetween.

5. The invention defined in claim 1 wherein said cover has an aperture formed therethrough defining an inner surface, and wherein said means for preventing excessive relative rotation includes a plurality of recesses formed in said inner surface and a corresponding number of protrusions formed on said means for selectively moving, said protrusions extending into said recesses and engaging said cover when a predetermined amount of relative rotation occurs therebetween.

6. The invention defined in claim 5 wherein each of said recesses is sized larger than said corresponding protrusions such that said protrusions do not normally engage said cover to permit a limited amount of relative rotation therebetween to occur.

7. The invention defined in claim 5 wherein said pluralities of recesses and protrusions are equally spaced apart.

8. The invention defined in claim 1 wherein said means for preventing excessive relative rotation limits such relative rotation to a maximum of five degrees.

9. The invention defined in claim 1 wherein said protrusions are formed on a release sleeve for the clutch.

* * * * *

UNITED STATES PATENT AND TRADEMARK OFFICE
CERTIFICATE OF CORRECTION

PATENT NO.   : 5,067,602
DATED        : November 26, 1991
INVENTOR(S)  : Richard A. Flotow and Gordon W. Denton It is certified that error appears in the above-identified patent and that said Letters Patent is hereby corrected as shown below:

Claim 1, Column 6, Lines 48-49:
    change "connecting" to -- moving said pressure plate --.

Claim 4, Column 6, Line 65:
    change "connecting" to -- moving said pressure plate --.

Signed and Sealed this

Eighth Day of March, 1994

Attest:

BRUCE LEHMAN

*Attesting Officer*    *Commissioner of Patents and Trademarks*